United States Patent [19]
Lincoln

[11] Patent Number: 6,065,599
[45] Date of Patent: May 23, 2000

[54] VIDEO CASSETTE STORAGE SLEEVE

[76] Inventor: Joyce L. Lincoln, 146-29 230th St., Rosedale, N.Y. 11422-0012

[21] Appl. No.: 09/036,858

[22] Filed: Mar. 9, 1998

[51] Int. Cl.[7] .................................................. B65D 85/575
[52] U.S. Cl. .................... 206/387.13; 206/472; 206/232; 206/459.5
[58] Field of Search ............................ 206/387.13, 387.1, 206/472, 473, 308.1, 311, 312, 232, 459.5; 281/36, 31; 40/661

[56] References Cited

U.S. PATENT DOCUMENTS

| | | | |
|---|---|---|---|
| 3,866,751 | 2/1975 | Holert | 206/387 |
| 4,717,021 | 1/1988 | Ditzig | 206/387 |
| 4,765,466 | 8/1988 | Ivey | 206/232 |
| 4,930,235 | 6/1990 | Gillen et al. | 40/152 |
| 5,103,978 | 4/1992 | Secor | 206/387 |
| 5,316,145 | 5/1994 | Cohodar | 206/387 |
| 5,353,931 | 10/1994 | Antik | 206/387 |
| 5,560,484 | 10/1996 | Tornisawa et al. | 206/307 |
| 5,595,297 | 1/1997 | Borck et al. | 206/387.13 |
| 5,651,455 | 7/1997 | Garcia | 206/287.1 |
| 5,655,656 | 8/1997 | Gottlieb | 206/308.1 |
| 5,682,990 | 11/1997 | Schluger | 206/308.1 |
| 5,730,288 | 3/1998 | Weisburn | 206/387.1 |
| 5,775,489 | 7/1998 | Vickers | 206/307.1 |

*Primary Examiner*—Paul T. Sewell
*Assistant Examiner*—Nhan T. Lam

[57] ABSTRACT

A new Video Cassette Storage Sleeve for protectively and decoratively covering a video cassette tape or the like. The inventive device includes an enclosing member having first and second parallel side walls, first and second end walls disposed perpendicularly between the first and second parallel side walls, and a top wall, the walls comprising a first fabric layer disposed in overlaying relationship to a second semi-rigid mesh layer. A display window on the second end wall is provided for insertion of a descriptive label.

1 Claim, 4 Drawing Sheets

VIDEO CASSETTE STORAGE SLEEVE

BACKGROUND OF THE INVENTION

1. Field of the Invention

The present invention relates to video cassette storage sleeves and more particularly pertains to a new Video Cassette Storage Sleeve for protectively and decoratively covering a video cassette tape or the like.

2. Description of the Prior Art

The use of video cassette storage sleeves is known in the prior art. More specifically, video cassette storage sleeves heretofore devised and utilized are known to consist basically of familiar, expected and obvious structural configurations, notwithstanding the myriad of designs encompassed by the crowded prior art which have been developed for the fulfillment of countless objectives and requirements.

Known prior art video cassette storage sleeves include U.S. Pat. No. 5,293,994; U.S. Pat. No. 5,405,008; U.S. Pat. No. 4,947,989; U.S. Pat. No. 5,156,271; U.S. Pat. No. Des. 350,458 and U.S. Pat. No. 4,789,058.

While these devices fulfill their respective, particular objectives and requirements, the aforementioned patents do not disclose a new Video Cassette Storage Sleeve. The inventive device includes an enclosing member having first and second parallel side walls, first and second end walls disposed perpendicularly between the first and second parallel side walls, and a top wall, the walls comprising a first fabric layer disposed in overlaying relationship to a second semi-rigid mesh layer.

In these respects, the Video Cassette Storage Sleeve according to the present invention substantially departs from the conventional concepts and designs of the prior art, and in so doing provides an apparatus primarily developed for the purpose of protectively and decoratively covering a video cassette tape or the like.

SUMMARY OF THE INVENTION

In view of the foregoing disadvantages inherent in the known types of video cassette storage sleeves now present in the prior art the present invention provides a new Video Cassette Storage Sleeve construction wherein the same can be utilized for protectively and decoratively covering a video cassette tape or the like.

The general purpose of the present invention, which will be described subsequently in greater detail, is to provide a new Video Cassette Storage Sleeve apparatus and method which has many of the advantages of the video cassette storage sleeves mentioned heretofore and many novel features that result in a new Video Cassette Storage Sleeve which is not anticipated, rendered obvious, suggested, or even implied by any of the prior art video cassette storage sleeves, either alone or in any combination thereof.

To attain this, the present invention generally comprises an enclosing member having first and second parallel side walls, first and second end walls disposed perpendicularly between the first and second parallel side walls, and a top wall, the walls comprising a first fabric layer disposed in overlaying relationship to a second semi-rigid mesh layer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Video Cassette Storage Sleeve apparatus and method which has many of the advantages of the video cassette storage sleeves mentioned heretofore and many novel features that result in a new Video Cassette Storage Sleeve which is not anticipated, rendered obvious, suggested, or even implied by any of the prior art video cassette storage sleeves, either alone or in any combination thereof.

It is another object of the present invention to provide a new Video Cassette Storage Sleeve which may be easily and efficiently manufactured and marketed.

It is a further object of the present invention to provide a new Video Cassette Storage Sleeve which is of a durable and reliable construction.

An even further object of the present invention is to provide a new Video Cassette Storage Sleeve which is susceptible of a low cost of manufacture with regard to both materials and labor, and which accordingly is then susceptible of low prices of sale to the consuming public, thereby making such Video Cassette Storage Sleeve economically available to the buying public.

Still yet another object of the present invention is to provide a new Video Cassette Storage Sleeve which provides in the apparatuses and methods of the prior art some of the advantages thereof, while simultaneously overcoming some of the disadvantages normally associated therewith.

Still another object of the present invention is to provide a new Video Cassette Storage Sleeve for protectively and decoratively covering a video cassette tape or the like.

Yet another object of the present invention is to provide a new Video Cassette Storage Sleeve which includes an enclosing member having first and second parallel side walls, first and second end walls disposed perpendicularly between the first and second parallel side walls, and a top wall, the walls comprising a first fabric layer disposed in overlaying relationship to a second semi-rigid mesh layer.

Still yet another object of the present invention is to provide a new Video Cassette Storage Sleeve that allows for the matching of the first layer design with the decor of the ambient surroundings.

Even still another object of the present invention is to provide a new Video Cassette Storage Sleeve that allows for the easy color and pattern categorization of video cassettes.

Still yet another object of the present invention is to provide a new Video Cassette Storage Sleeve that allows for the easy interchange of coverings.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
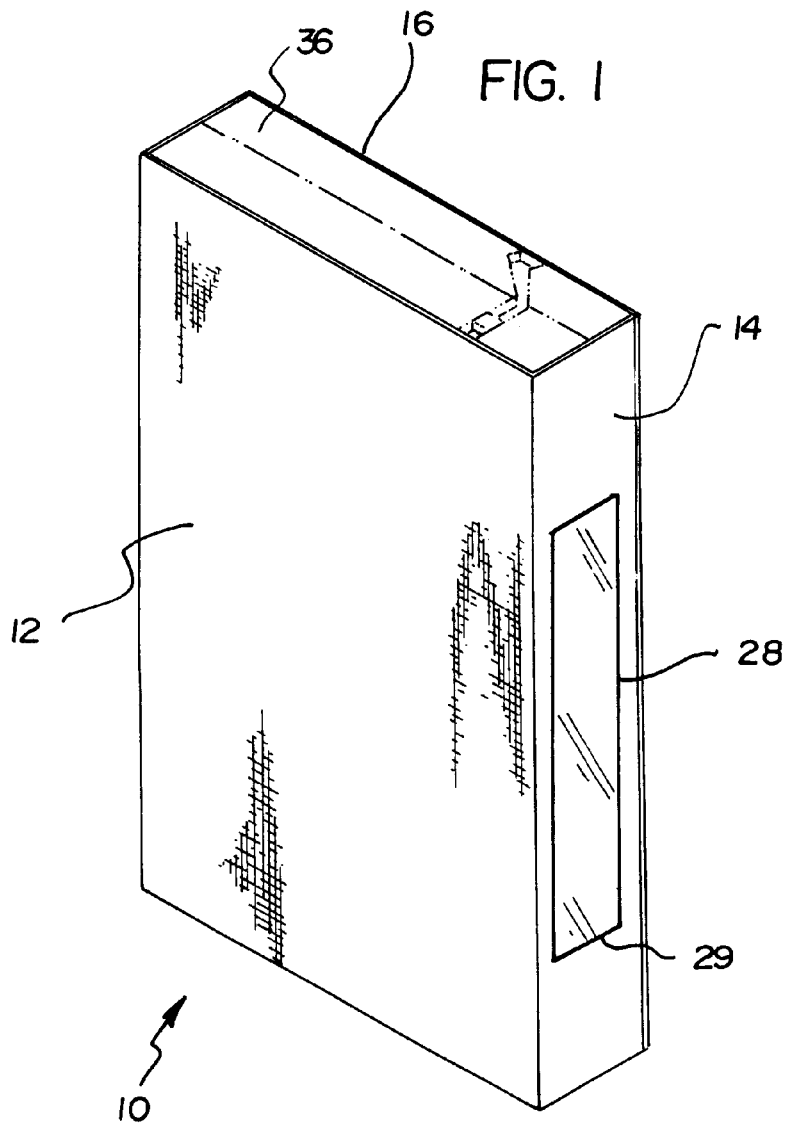
FIG. 1 is a left side perspective view of a new Video Cassette Storage Sleeve according to the present invention.
Figure 2:
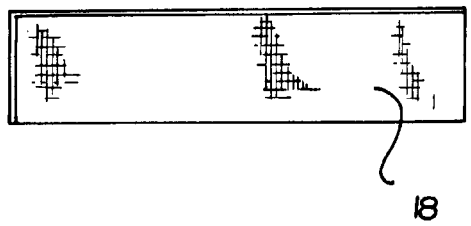
FIG. 2 is a elevation view thereof showing the top wall.

With reference now to the drawings, and in particular to FIGS. 1 through 7 thereof, a new Video Cassette Storage Sleeve embodying the principles and concepts of the present invention will be described.

More specifically, it will be noted that the Video Cassette Storage Sleeve comprises an enclosing member 10 having a first parallel side wall 13, a second parallel side wall 12, a first end wall 14, a second end wall 15 and a top wall 18. The first and second end walls 14,15 are disposed perpendicularly between the first and second parallel side walls 13, 12. The top wall 18 completes the enclosing member 10 having an open portion 16, through which a video cassette 36 can be inserted.

With reference to FIG. 1 a display pocket 28 is shown including an open end 29 for insertion of a descriptive label. The display pocket 28 is preferably a transparent plastic material easily adhered to the first layer 32, further described hereinafter.

Figure 3:
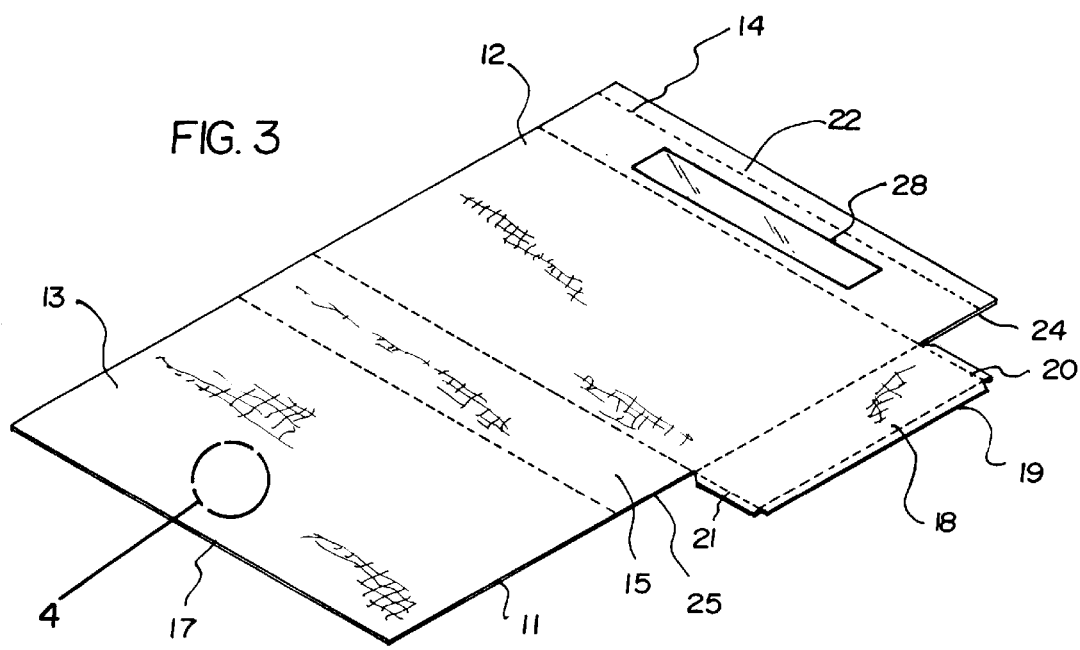
FIG. 3 is a perspective illustration of the pattern of the present invention.
Figure 4:
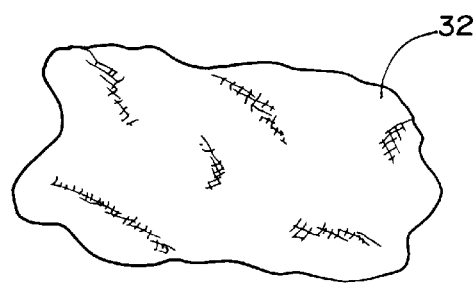
FIG. 4 is a sectional view showing the first layer and the second layer.

With reference to FIG. 3 there is shown a pattern for making the new Video Cassette Storage Sleeve. The method of making such comprises the initial step of providing first and second layers of material 32 and 34. The first layer 32 is formed of a fabric material. The second layer 34 is formed of a semi-rigid mesh material such as plastic mesh (FIG. 4).

The first and second layers 34,32 are overlapped and adhered to each other by any suitable means including gluing.

A pattern is then cut having a first side wall 13, a first end wall 15 adjacent to the first side wall 13 along a length thereof, a second side wall 12 adjacent the first end wall 15 along a length thereof, a second end wall 14 adjacent to the second side wall 12 along a length thereof, a first flap 22 adjacent to the second end wall 14 along a length thereof, a top wall 18 adjacent to the second side wall 12 along a width thereof, a second flap 19 adjacent to the top wall 18 along a length thereof, and third and fourth flaps 20 and 21 adjacent to the top wall 18 along opposite widths thereof.

Finally the first and second flaps 22 and 19 are adhered to the first side wall 13 at a first side wall edge 17 and first side wall bottom edge 11 respectively as by gluing or sewing. The third flap 20 is similarly adhered to the second side wall 12 at a second side wall top edge 24 and the fourth flap 21 is adhered to the first side wall 13 at a first side wall top edge 25 in such manner that the first layer 32 forms an outside surface 51 thereof.

Figure 5:
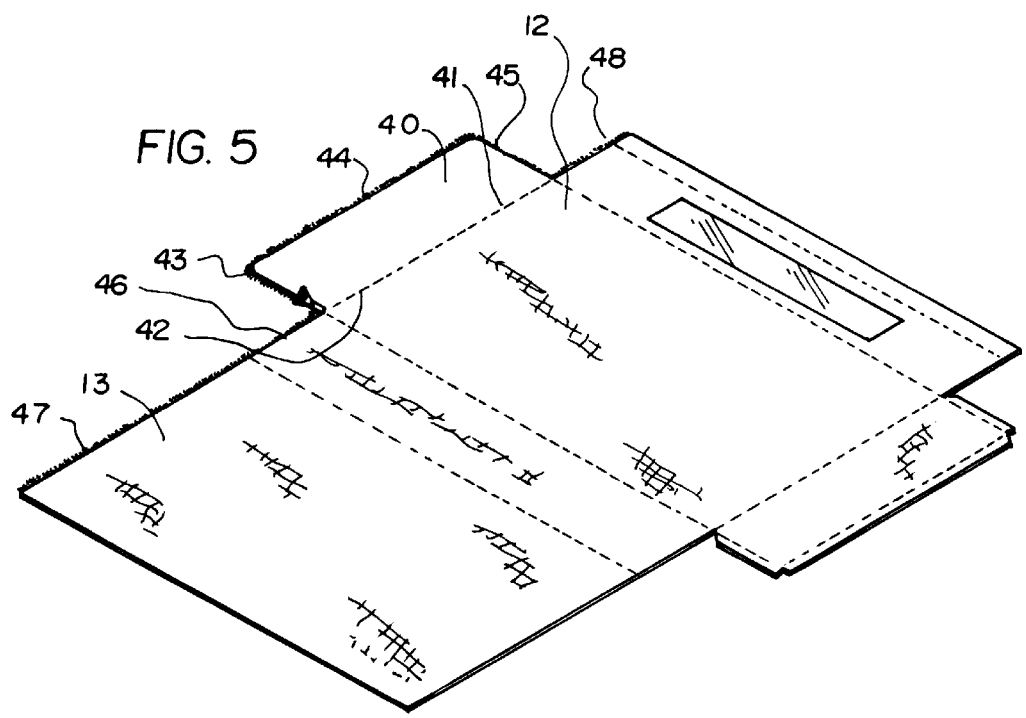
FIG. 5 is a perspective illustration of an alternative embodiment of the present invention.

Alternatively, as shown in FIG. 5, a bottom wall 40 may be included in the pattern, the bottom wall 40 having a first edge 41 adjacent to a second side wall bottom edge 42. The bottom wall 40 is shown having second, third and fourth edges 43, 44, and 45 respectively. A means for releasably attaching the second, third and fourth edges 43, 44 and 45 to a first end wall bottom edge 46, a first side wall bottom edge 47 and a second end wall bottom edge 48 respectively is shown including a zipper.

Figure 6:
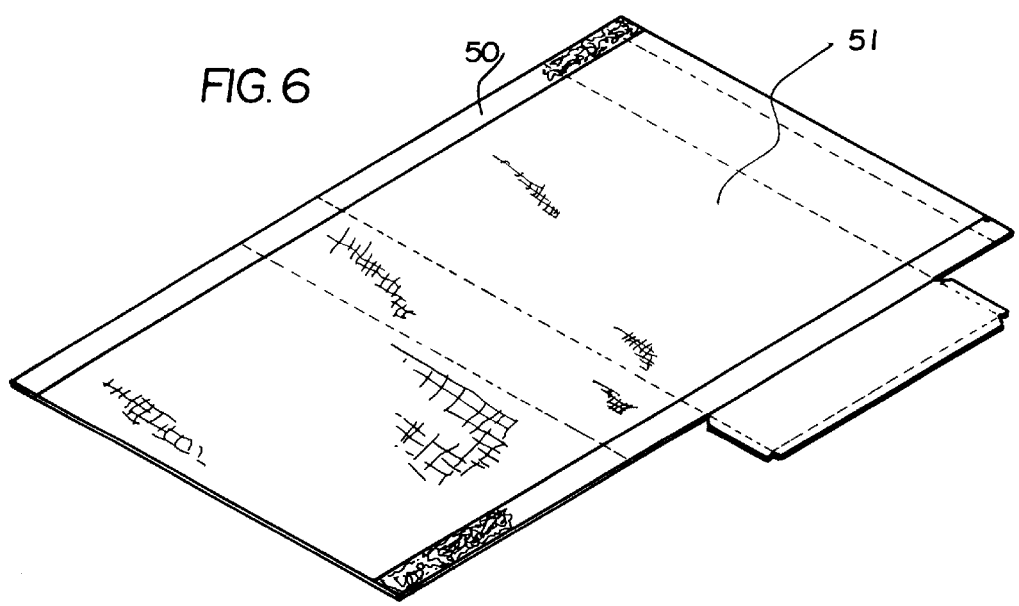
FIG. 6 is a perspective illustration of another embodiment of the present invention.
Figure 7:
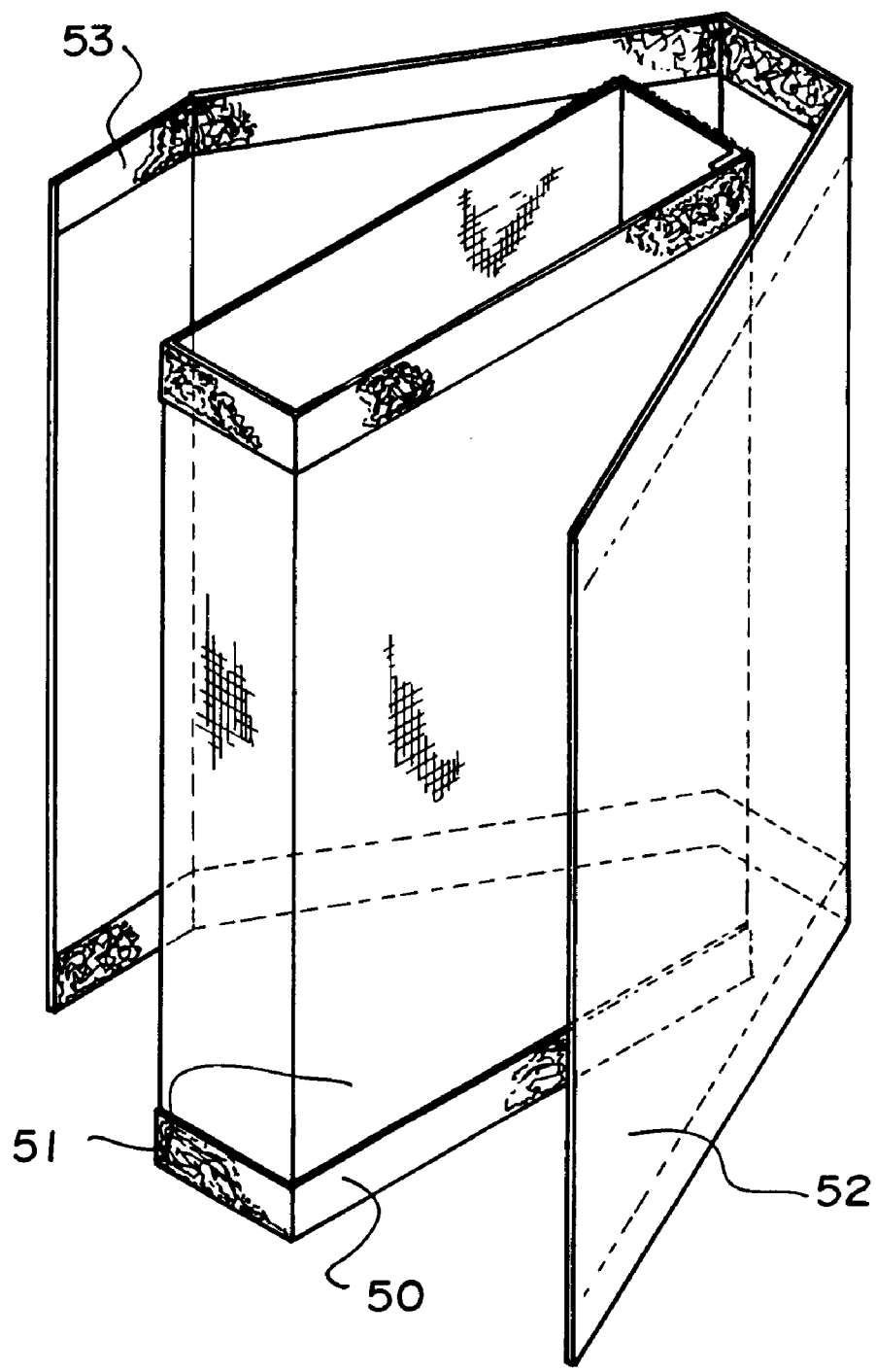
FIG. 7 is a perspective view of the present invention showing the enclosing member and attachable covering.

Alternatively, as shown in FIGS. 6, and 7 a means for removably attaching a covering 52, preferably formed of a fabric material, is shown adhered to the outside surface 51. The attachment means is shown including strips of Velcro®. The Velcro® strips shown may include either the first or second members of a hook and eye fastening system.

In use, various different first layers 32 of fabric can be selected to achieve the objects of the invention, to wit to protect and decorate video cassettes and the like and to categorize various video cassettes and the like and to match the first layer design with the decor of the ambient surroundings. Additionally a descriptive label can be inserted into the display pocket 28 to further aid in identifying a video cassette or the like. If additional protection is desired for the video cassette, the bottom wall 40 may be releasably attached to totally enclose the video cassette. The outside decor of the enclosing member 10 can be changed by merely attaching a covering 52 to the enclosing member 10 by means of Velcro® strips 50 and 53.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A Video Cassette Storage Sleeve comprising:

an enclosing member having first and second parallel side walls, first and second end walls disposed perpendicularly between the first and second parallel walls, and a top wall forming a closed end, and wherein the first and second parallel side walls, the first and second end walls, and the top wall further comprise a first fabric material layer disposed in overlaying relationship to a second mesh material layer.

* * * * *